United States Patent

Trakas

[11] Patent Number: 5,180,594
[45] Date of Patent: * Jan. 19, 1993

[54] INTERNALLY HEATED SPRUE BUSHING WITH THERMALLY CONDUCTIVE SLEEVE

[76] Inventor: Panos Trakas, 1820 Amelia La., Addison, Ill. 60101

[*] Notice: The portion of the term of this patent subsequent to Nov. 21, 2006 has been disclaimed.

[21] Appl. No.: 746,966

[22] Filed: Aug. 19, 1991

Related U.S. Application Data

[62] Division of Ser. No. 507,392, Apr. 10, 1990, Pat. No. 5,052,100.

[51] Int. Cl.$^5$ ............................. B29C 45/72
[52] U.S. Cl. ........................ 425/547; 29/611; 219/544; 219/548; 425/549
[58] Field of Search ............ 425/547, 548, 549; 219/544, 548; 29/611

[56] References Cited

U.S. PATENT DOCUMENTS 4,882,469 11/1989 Trakas ..................... 425/549
4,922,082 5/1990 Bredt et al. .............. 425/547
5,052,100 10/1991 Trakas ..................... 425/549

*Primary Examiner*—Tim Heitbrink
*Attorney, Agent, or Firm*—Lockwood, Alex, FitzGibbon & Cummings

[57] ABSTRACT

A sprue bushing which has improved heat transfer characteristics and a method of making the same are described. A cylindrical bushing body having a first, preselected uniform diameter has a cavity formed therein which axially extends within the bushing body for a predetermined length. A bushing inner core which has an outer layer or sleeve of a high heat conductive material is formed in the cavity extending between the two ends of the bushing body. A heating element in the form of a ceramic insulator sleeve is inserted into the bushing body cavity and a particulate refractory material is deposited into the cavity to fill the remainder of the cavity. When filled, the bushing body is swaged down to a second preselected uniform diameter to compact the powdered refractory together with the preformed sleeve to form a solid heating element. A runner passage is then drilled through the inner core.

18 Claims, 4 Drawing Sheets

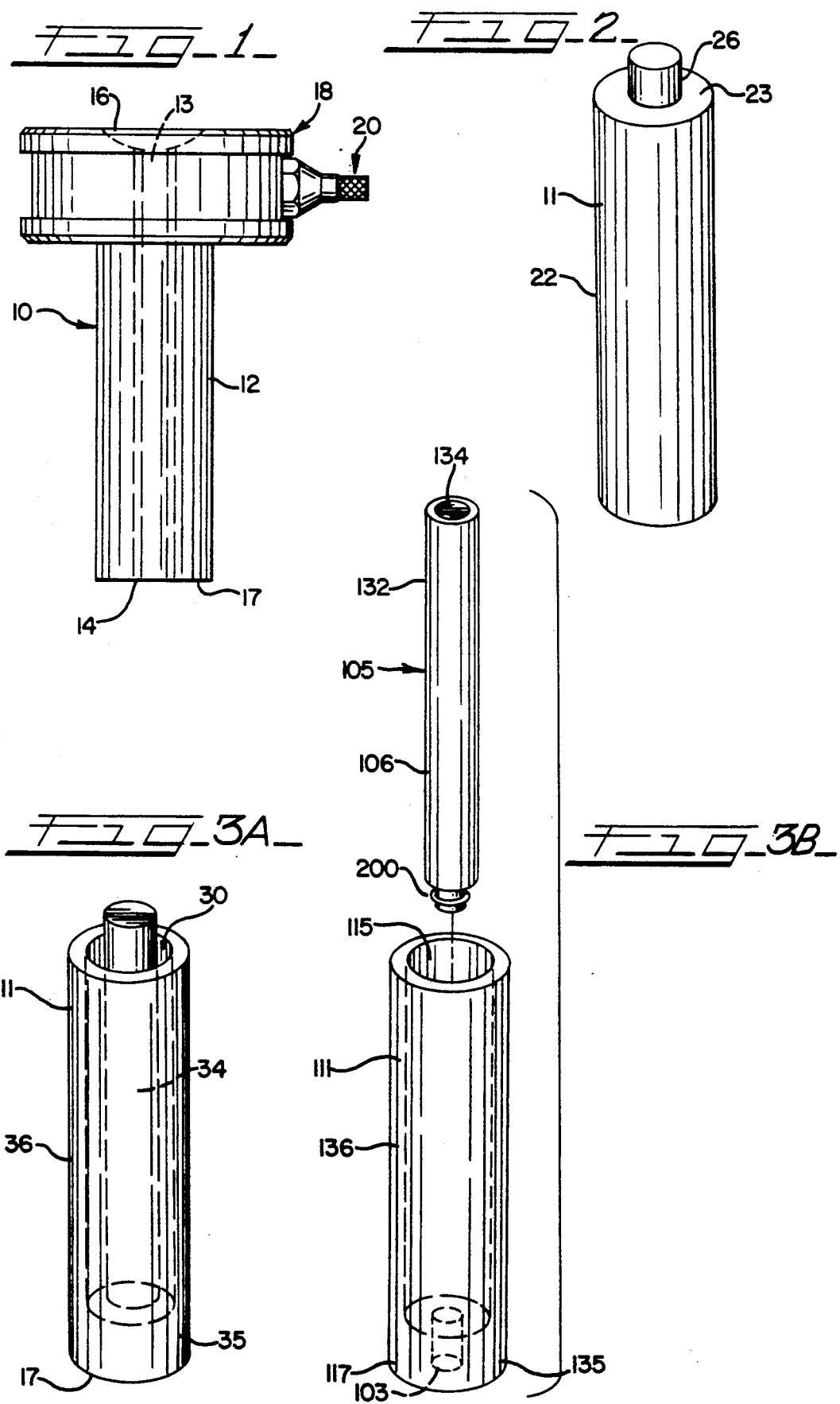

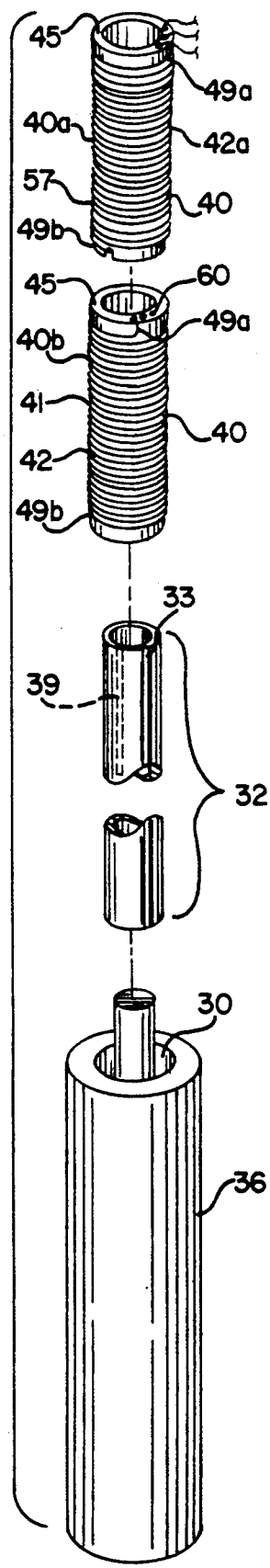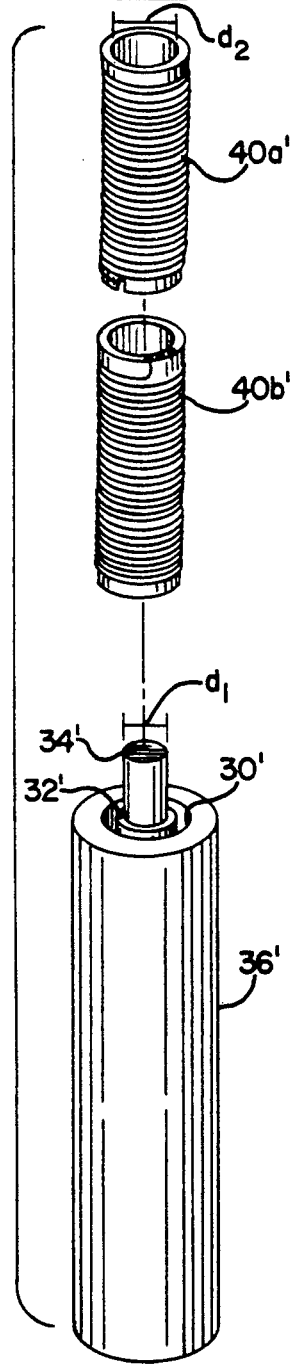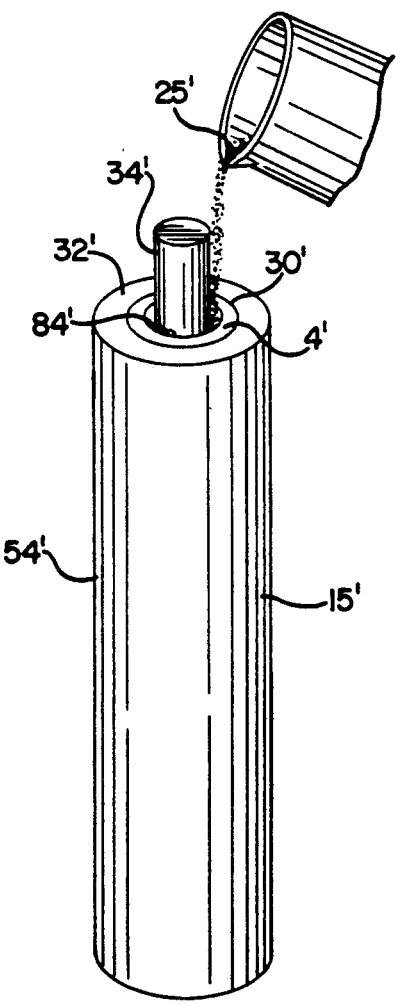

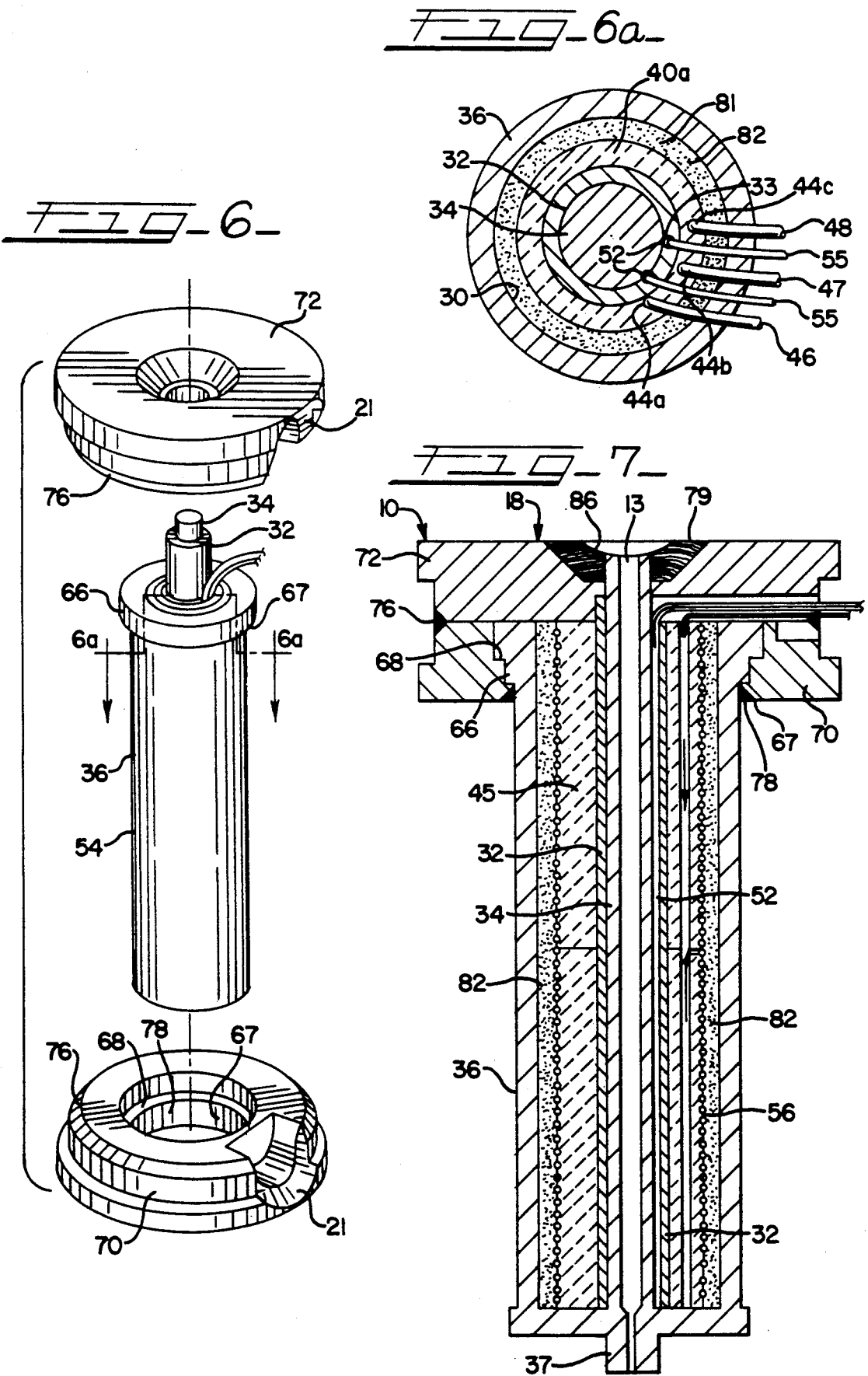

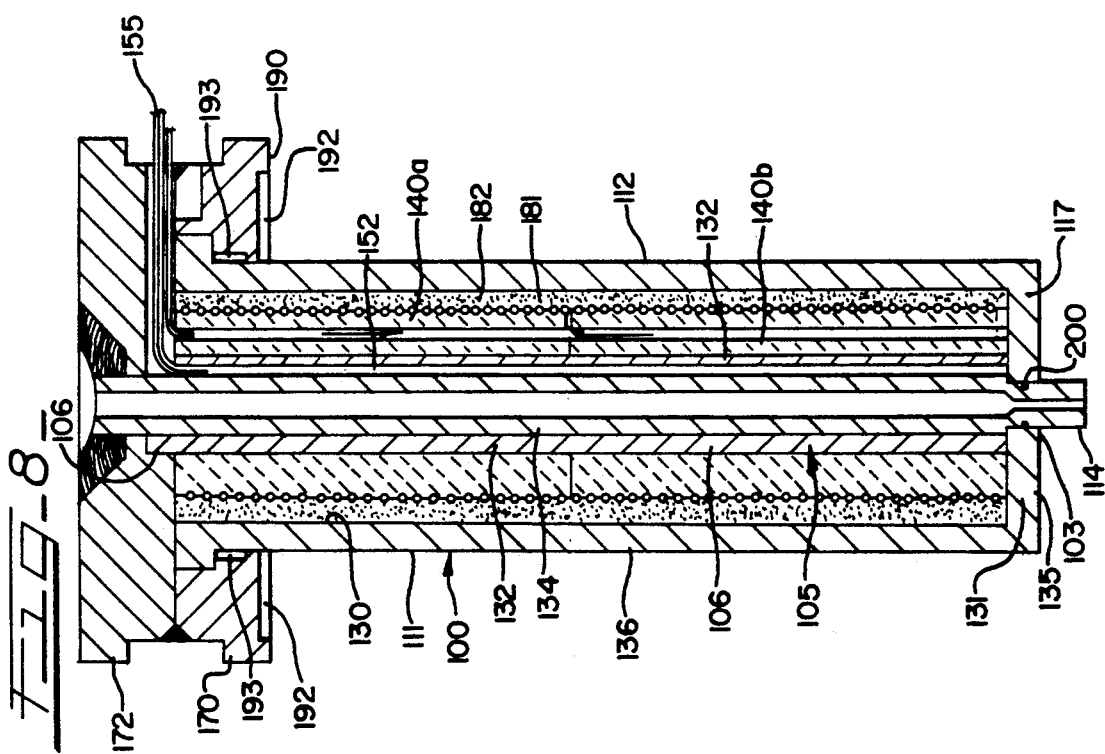

INTERNALLY HEATED SPRUE BUSHING WITH THERMALLY CONDUCTIVE SLEEVE

This is a divisional application of a prior application Ser. No. 507,392, filed Apr. 10, 1990 now U.S. Pat. No. 5,052,100.

BACKGROUND AND SUMMARY OF THE INVENTION

This invention relates generally to sprue bushings for injection molding machines and, more particularly, to internally-heated sprue bushings in which the sprue bushing inner core has an outer coating of highly thermally conductive material and to the method of making such sprue bushings. In this regard, one important aspect of the present invention is directed to an internally heated bushing assembly which is especially suited to handle pressurized melt, which assembly includes a unitary bushing casing-core element having an integral outer sidewall, endwall and elongated copper-clad inner core having a melt running passage therethrough.

Sprue bushings are commonly used in injection molding to provide a heated flowpath for conveying molten plastic or melt from an injection molding machine manifold or nozzle to an injection mold cavity opening. Typically, these sprue bushings may include a separate bushing casing portion housing a heating element and a separate, inner bushing core portion through which the melt flows. The bushing core is usually disposed in the center of the bushing casing and extends axially through the casing between the bushing inlet and an outlet end thereof with one end of the core projecting through a hole in the casing. Other sprue bushings such as that shown in U.S. Pat. No. 4,882,469 have an integral casing-core construction wherein the casing and core are formed from one piece with an annular cavity formed therebetween which accommodate a preformed tubular heater element. In either of such sprue bushing constructions, the inner core is surrounded by a tubular or spiral heating element set in a particulate, compacted refractory material. The refractory material insulates the heating elements and conveys or transmits heat from the heating element(s) to the center core portion of the bushing.

Although the refractory material transmits heat adequately to the bushing center core, it is desirable to increase the effectiveness of heat transfer from the heating element to the inner core. This is accomplished in the present invention by providing the inner core with an outer layer of a highly thermally conductive material, such as copper or an alloy thereof. The outer layer of the highly thermally conductive material provides for more efficient heating of the inner core melt runner passage for substantially the entire length thereof. Significantly, the outer thermal layer, or cladding, of copper may extend between the point where the bushing inner core meets the head member at the melt inlet of the sprue bushing and the rear inner wall of the bushing casing near the bushing outlet. The transfer of heat through the outer thermal layer or cladding of copper or other highly thermally conductive material is effectively accomplished along substantially the entire length of the center core, thereby effectively improving the heat distribution along the melt runner passage.

The present invention provides the above-mentioned benefits and is directed to a novel sprue bushing assembly in which the bushing inner core or central melt runner passage has an outer layer of a highly thermally conductive material applied thereto, such as copper. As such, some of these sprue bushing assemblies are characterized by a unique bushing casing-core element which includes an integral outer sidewall, endwall and elongated inner core having a melt runner passage extending therethrough which inner core has added thereto an outer layer, or sleeve, of high thermally conductive material. Other of these sprue bushings are characterized by a unique bushing casing-core element which includes an integral outer sidewall and endwall, and a separate elongated inner core joined to the bushing endwall, having a melt runner passage extending therethrough in which the inner core has an inner melt passage portion and an outer thermally conductive portion.

In a sprue bushing assembly incorporating the principles of the present invention, a cylindrical metal blank is provided with a cavity axially extending within the blank. An elongated inner core member, which can either be integrally formed with the bushing casing endwall or separately joined thereto, is spaced apart from the outer wall of the bushing casing. The cavity contains a sleeve or annular space filled with a high thermally conductive material which closely abuts the outer surface of the inner core member and also contains at least one heating element in the form of a hollow preformed electrically non-conductive sleeve which encircles the inner core thermally conductive sleeve. Open spaces which occur in the casing cavity between the heating sleeve and bushing casing are filled with a powdered or particulate refractory material to form a heater-bushing blank assembly. When filled, the heater-bushing blank assembly is then swaged and reduced down to a preselected uniform diameter, thereby forming all of the components which fill the casing cavity, i.e., the thermally conductive sleeve, the refractory material and preformed heating element, into a unified mass which is substantially free of voids. A head member containing electrical conduction and temperature sensing wires to the heating element is then added to the top portion of the bushing-heater assembly and the cap then firmly welded to the bushing assembly. An opening is drilled through the bushing core to provide a melt flowpath. The outlet end of the bushing is then finished to form a final bushing outlet tip.

Accordingly, it is a general object of the present invention to provide a method of manufacturing an improved sprue bushing from a single metal blank having improved heat transfer means operatively associated with the inner core and wherein the inner core is integral with the bushing casing which eliminates melt leakage and heater element burnout.

Another object of the present invention is to provide an injection molding sprue bushing in which the bushing core has a copper outer surface in contact with a multi-stage heating element for supplying heat to substantially the entire length of the bushing core.

A further object of the present invention is to provide a unitary sprue bushing wherein the bushing includes an outer annular casing, an inner core axially extending through the bushing casing, a copper sleeve formed on the bushing inner core, and an annular cavity encircling the inner core and separating the bushing casing from the inner core which cavity contains at least one preformed non-electrically conductive sleeve.

A yet further object of the present invention is to provide an internally heated sprue bushing having an inner core with an outer copper sleeve which is integral with the bushing casing and in which a thermowell is received in contact with the inner core and copper sleeve.

Still another object of the present invention is to provide a sprue bushing for injection molding having an outer bushing casing, an inner core axially extending through the bushing casing, the inner core having an outer coating of highly heat conductive material and an inner melt runner passage axially extending through the bushing inner core, the bushing further including an annular cavity disposed between the inner core and bushing casing, the cavity having two heating element means in the form of preformed sleeves axially aligned therein, each heating element means providing heat to a different portion of the inner core and its outer coating of the sprue bushing.

These and other objects, features and advantages of the present invention will be apparent from the following detailed description, taken in conjunction with the accompanying drawings wherein like reference numerals refer to like parts.

BRIEF DESCRIPTION OF THE DRAWINGS

In the course of this description, reference will be made to the attached drawings in which:

FIG. 1 is an elevational view of a sprue bushing constructed in accordance with the principles of the present invention;

FIG. 2 is a perspective view of a metal blank from which the sprue bushing of FIG. 2 is formed and showing the formation of a stem on the sprue bushing blank.

FIG. 3A is a perspective view of the bushing blank of FIG. 2 showing the location and extent of the bushing-casing annular cavity in the blank;

FIG. 3B is a perspective view of an alternate step of forming the bushing-casing annular cavity in a metal blank by the use of a separate inner core member;

FIG. 4A is an exploded perspective view of the bushing casing of FIG. 3A showing how the inner thermally conductive sleeve and heater elements are assembled into the bushing-casing cavity;

FIG. 4B is a view showing an alternate step of forming the inner thermally conductive sleeve in the bushing-casing cavity;

FIG. 5 is an exploded perspective view of a bushing casing showing an alternate step of assembling the heater elements into the bushing-casing cavity;

FIG. 6 is an exploded perspective view showing how the bushing end cap portions are assembled onto the bushing-heater assembly;

FIG. 6A is a sectional view of the bushing of FIG. 6 taken along lines 6A—6A; and FIG. 7 is a sectional view of one embodiment of a completed sprue bushing according to the principles of the present invention; and FIG. 8 is a sectional view of an alternate embodiment of a completed sprue bushing according to the principles of the present invention.

DETAILED DESCRIPTION OF THE PREFERRED EMBODIMENTS

Referring to the drawings and in particular to the FIGS. 1-8, a sprue bushing 10, constructed in accordance with the principles of the present invention is shown as having an elongated bushing body 12 extending between the bushing outlet end 14 and the bushing inlet end 16. An enlarged end cap 18 is located at the bushing inlet end and houses a shielded electrical cable 20 located in a connection cavity 21 and extends outwardly from the end cap 18. The cable 20 contains the necessary electrical wires which lead to an external source of power (not shown) which energizes the bushing and monitors the temperature of the bushing.

The first step in making the bushing 10 is forming a metal blank 22 into an elongated cylinder having a preselected, uniform diameter such as by machining, casting or electric discharge machining ("EDM"). As illustrated in FIG. 2, the top portion 23 of the blank 22 may be machined to form an initial bushing body 11 which has an elongated stem 26 centrally disposed in the body 11 and axially extending therefrom. The stem 26 defines the initial outer diameter of the bushing inner core 34. Although the stem 26 is shown as protruding past the end of the bushing body 11, if desired, the stem 26 may be formed at a later stage in the manufacturing process by removing an upper portion of the bushing outer sidewall 36.

In accordance with one aspect of the present invention, and as illustrated in FIG. 3A, the bushing body 11 is then machined to form an elongated annular cavity 30 which defines an inner core 34 and separates it from the bushing casing or outer sidewall 36. The annular cavity 30 extends substantially the entire length of the bushing body 11, and terminates near the outlet end 14, leaving a bushing endwall 17 which is integral with the bushing outer sidewall 36 and the elongated inner core 34. Preferably, an excess bushing body end or outlet portion 35 is left on the bushing body 11 near the endwall 17 so that the bushing tip 37 can be machined to a desired configuration as shown. An elongated inner thermal core sleeve, or cladding, 32 of a highly thermally conductive material such as copper or a beryllium copper alloy having approximately 1% beryllium, 4% cobalt and the remainder essentially copper, is inserted over the elongated inner core member 34. The inner thermal sleeve extends for substantially the entire length of the inner core member 34 from the inner face of the bushing endwall 17 to up into the bushing endcap 18 (shown in FIGS. 7 and 8 as terminating beneath the seal weld 79). The thermal inner sleeve 32 is preferably dimensioned so as to allow the sleeve 32 to be slipped over the inner core member 34. The thermal inner sleeve 32 may have one or more longitudinal grooves or slots 33 therein which are adapted to receive thermowells 52, as explained more fully below. The annular cavity 30 is dimensioned in width to loosely receive heating means in the form of one or more preformed hollow non-electrically conductive, ceramic insulator sleeves 40 wound with resistance wire 42 to form an electrical heating coil 57 extending along the length of the insulator sleeve 40. Each ceramic insulator sleeve 40 encircles the thermally conductive sleeve 32 in a slip-fit relationship.

FIGS. 4B and 5 show an alternate method of forming the thermally conductive sleeve 32' on the inner core member 34'. In this embodiment, no separate thermal sleeve is used, but rather the thermal sleeve 32' is cast in place. Rather, a hollow ceramic form 4' having an inner diameter equal to the desired outer diameter of the thermal sleeve 32' inserted into the annular space 30' in the bushing casing so that a second inner annular space 84' is formed between the ceramic form 4' and the inner core member 34'. This second annular space 84' is then filled with a particulate highly thermally conductive material 25', such as copper or an alloy thereof, to form a bushing sleeve assembly 15'. The bushing sleeve assembly 15' is then heated in a vacuum furnace until the particulate thermally conductive material is melted and the molten material flows throughout the second annular space 84' to fill the annular space 84'. The degree and duration of this heating step must be sufficient to melt the particulate material 25' and fill the space 84', but cannot be sufficient to release any brazed joints on sprue bushing body.

Melting the particulate material 25' under a partial vacuum results in the copper or alloy fusing with the elongated inner core member 34' and improving the bond therebetween. After the particulate material 25' is melted, the bushing sleeve assembly 15' is removed from the furnace and allowed to cool and the ceramic form 4' is removed from the annular cavity 30'. The cast sleeve 32' may be machined to accommodate a thermowell (not shown) or the thermowell slot may be formed by way of an appropriate projection on the ceramic form 4'. Then, two ceramic insulator heating sleeves 40a', 40b', having an inner diameter, $d_2$, which is greater than the diameter, $d_1$ of the inner elongated inner core member 34' and which matches that of the cast thermal sleeve 32' are inserted into the annular cavity 30'. The cast bond between the inner core 34' and the thermal sleeve 32' increases the heat transfer from the heating element sleeves 40a', 40b' through the thermal inner sleeve 32' to the inner core member 34'. This thermal sleeve 32' provides a more even temperature distribution along the melt runner passage of the inner core member 34'. The bushing-heater assembly 54' can then be swaged down to a preselected diameter as explained below.

After the thermal inner sleeve 32 is applied to the inner core member 34, the heating element(s) 40 are inserted into the annular cavity 30. FIGS. 4A illustrates the assembly of a sprue bushing having a two-stage heating element wherein a first preformed heating element insulator sleeve 40a which forms the first stage heater of the sprue bushing and a second preformed heating element insulator sleeve 40b which forms the second stage heater of the sprue bushing are placed into the annular cavity 30. The first and second insulator sleeves are axially aligned in the annular cavity 30 with each other. The inner diameter of each preformed insulator sleeve 40a, 40b is slightly greater than the outer diameter of the inner thermal sleeve 32, to allow the insulator sleeves to be slip-fit over the inner thermal sleeve 32 while the insulator sleeve outer diameter is substantially less than the inner diameter of cavity 30. The insulator sleeve clearance with the bushing casing forms a first annular space 81 which surrounds the outer diameter of the heating element sleeves 40a, 40b. A particulate ceramic refractory material 82 such as powdered magnesium oxide, which facilitates the transfer of heat between the heating element and the inner thermal sleeve 32 and insulates the heating coil 57 from contact with the metal bushing casing, is deposited into the annular space 81 to form a bushing-heater assembly 54.

Magnesium oxide is a particularly suitable ceramic refractory material for this purpose since, when fully compacted, it has excellent heat transfer capabilities and good dielectric strength at high temperatures. The powdered refractory is preferably finely ground so that it completely fills most of the initial air voids caused by pouring the refractory into the annular space 81. Any remaining air voids in the refractory material are removed when the bushing-heater assembly 54 is swaged down to a second preselected diameter as explained in greater detail below. Due to manufacturing tolerances, an occasional small gap may appear between the inner diameter of the insulating sleeves 40a, 40b and the outer diameter of the inner thermal sleeve 32, when the sleeves are inserted into the bushing cavity 30. However, this gap is also filled with the refractory material 82 when the bushing heater assembly 54 is swaged.

The outside periphery of each sleeve 40a, 40b is wound with a predetermined length of resistance wire 42, such as nichrome wire, to form an electrical heating coil 57 which extends along the length of the sleeve 40. The heating coil 57 includes a plurality of circumferential turns 41 having a predetermined axial spacing 56 between adjacent turns. The opposite ends 49a, 49b of the resistance wire 42 engage the electrical conducting leads 46, 47, 48 of power wires that extend through the sleeves 40a, 40b in the manner described below and up through the bushing cap 18 and out through the connection recess 21 via cable 20 to an external source of power. The ends 49a, 49b of the resistance wire are inserted into sleeve conduit means in the form of three aligned axial passages 44a, 44b, 44c which are present in the sleeve wall 45 and which axially extend through the heating element insulator sleeves 40a, 40b.

The conducting leads 46, 47, 48 and the heating coil resistance wire ends 49a, 49b engage each other in electrical engagement relationship in the sleeve passages 44a, 44b and 44c to form an electrical connection for energizing the resistance wires. Opposite ends 49a, 49b of the resistance wires are inserted into one of the three passages on each sleeve end to contact the conducting leads 46-48, as explained in detail below. In order to prevent the resistance wire ends from contacting any metal portion of the bushing, the opposite ends of sleeves 40a, 40b may contain radial recesses 60 to convey the resistance wire ends into the preselected sleeve passage.

After the second stage sleeve 40b is wound with resistance wire 42, the bottom wire end 49b is inserted into one sleeve passage shown as first passage 44a. The opposite or top resistance wire end 49a is inserted into a second passage distinct from the first passage, shown as center passage 44b. A similar winding arrangement is used with the top or first stage sleeve 40a. The bottom wire end 49b of the resistance wire 42 used on the first stage sleeve 40a is inserted in the remaining, or third passage 44c and the top opposite wire end 49b is inserted in the center passage 44b. The wound sleeves 40a, 40b are then aligned such that the three passages 44a, 44b and 44c of each heater stage are also axially aligned. Electrical conducting means in the form of conducting leads 46, 47 and 48 are inserted into passages 44a, 44b and 44c, respectively to engage the resistance wire ends present in the sleeve passages. First lead 46 passes through the first stage first passage 44a and does not engage any first stage resistance wire therein and thus is the energizing lead to the heater second stage 40b. It continues well into the second sleeve first passage 44a until it engages the bottom resistance wire end 49b to establish a current conducting relationship therebetween. The second stage heater circuit is completed by the insertion of second conducting lead 47 into the second, center passages 44b of the first and second stages so that it completely extends through first stage 40a and engages the opposite wire length 49a of the second stage resistance wire.

In extending through the first stage center passage 44b of the first sleeve 40a, the center conducting lead engages the lower end 49b of first stage resistance wire 42a. The third and final conducting lead 48 is the energizing lead for the first heater stage 40a and is inserted into the first stage third passage 44c to complete the first stage sleeve heating circuit. All three of the conducting leads extend sufficiently out of the sleeve openings at the top of the bushing for connection to a cable 20 which leads to an external power source. It will be appreciated that this unique wiring arrangement allows the operator to supply power independently to the first and second or both, heating sleeves.

The heating element assembly is completed by the insertion of means for monitoring the temperature of the inner core member 34 in the form of one or more thermowells 52 which may be disposed in either a slot or groove 33 in the inner thermal sleeve 32 such that the thermowell 52 abuts the inner core member 34. Where a single stage heating element is used in the annular cavity 30, the inner thermal sleeve 32 has only one slot 33 therein. However, where a two stage heating element is used in the annular cavity 30, the inner thermal sleeve 32 will have a first slot 33 which extends its entire length and a second slot 39 which will extend only for the length of the top stage heating element as shown in phantom in FIG. 4A. A thermocouple lead 55 is inserted into the one or more thermowells 52 and extends therein for substantially the entire length thereof. The thermowell 52 becomes firmly embedded in the bushing casing cavity 30 as a result of the swaging process (explained below) and thus, if a thermocouple should fail in operation, it can be easily removed and replaced at the bushing end cap 18 and the sprue bushing need not be discarded. With the use of two thermocouples 55 in two thermowells 52 is possible to monitor the heat being applied to the bushing inner core 34 by the separate heating elements.

After the annular cavity 30 has been filled with the preformed sleeves 40a, 40b and the powdered refractory 82, the entire filled bushing-heater assembly 54 is then swaged in a conventional manner to compress the refractory 82 around the heating element insulator sleeves 40a, 40b to form a unified mass in the annular cavity 30. The swaging also reduces the bushing heater assembly to a second, uniform preselected diameter. The large pressure exerted on the bushing-heater assembly during swaging forces the powdered refractory 82 into the first annular space 81 surrounding the preformed insulator sleeve 40, eliminates any air voids in the refractory and maintains the spacing 56 between adjacent resistance wires. This compaction ensures that the resistance wires 42 are maintained in their positions as wound on the insulator sleeves 40a, 40b. The swaging also compacts the magnesium oxide refractory 82 to a preferred density which is desired for excellent heat transfer. The swaging further compacts the ceramic sleeves around the thermal inner sleeve 32 around the inner core member 34 and ensures a proper heat transfer contact therebetween.

After the bushing body 11 has been swaged, the top of the bushing assembly 54 can be further machined as illustrated in FIG. 7 to provide radially extending flanges 66 which abut complementary shoulders 68 located in the bottom half 70 of the bushing end cap 18. The end cap bottom half 70 has an opening 67 to accommodate the final diameter of the bushing assembly and slides over the bushing body 11 to engage the bushing flanges 66. The top half 72 of end cap 18 slides over the bushing stem 26 to complete the formation of bushing end cap 18. The top and bottom end cap halves each have similar cable connection recesses 21 located therein to accommodate the insertion of a shielded cable connection 20 therein. After the halves are assembled onto the bushing body 11, they are joined together, as by welding, where they meet at an exterior chamfer 76 around the entire periphery of the head cap 18. The bottom half 70 of end cap 18 may be welded to the bushing body 11, at an inner chamfer 78 which extends around the periphery of the bottom end cap opening 67. A final weld 79 joins the end cap top half to the inner core 34 where the top cap 72 meets the inner core 34. (FIG. 7). The runner passage 13 is then drilled through the center of the inner core 34 to provide a melt flow-path which extends through the sprue bushing body 12 from the inlet end 16 to the outlet end 14. After the runner passage 13 is drilled, the top of the end cap 18 may be machined to provide a well 86 to receive the injection molding machine nozzle or manifold outlet. Alternatively, the bottom half 70 of the end cap 18 can be formed integrally with the bushing body 12, if the bushing body 12 is chosen from stock having a suitable outer diameter.

Finally, the outlet end 14 of the sprue bushing body 12 is finished by machining to remove the excess end portion 35 to form the desired type of tip 37.

In addition to the step described above, the present invention may also be effected in a sprue bushing 100 having a separate inner core member 134. As best illustrated in FIGS. 3B and 8, during initial forming, the bushing body 111 may be machined to form an elongated cylindrical central cavity 115 which defines the bushing casing outer sidewall 136 and the bushing endwall 117. The bushing central cavity 115 extends for substantially the entire length of the bushing body 111, and terminates at the bushing outlet 114 near the endwall 117 thereof, leaving a bushing endwall 117 which is integral with the bushing casing outer sidewall 136.

After the central cavity 115 is formed in the bushing body 111, the bushing endwall 117 may be drilled to form an opening 103 to receive a distinct and separately formed inner core-thermal sleeve assembly 105. The inner core-thermal sleeve assembly 105 may be formed by inserting an elongated sleeve 106 of highly thermally conductive material over a portion of the separate elongated inner core member 134 as shown in FIG. 3B, and which may have its outlet end configured to receive a brazing insert 200. (FIG. 8). The inner core-thermal sleeve assembly 105 is then placed into the bushing body endwall opening 103 and is joined to the bushing body 111 by a suitable effective method, such as brazing.

When the inner core-thermal sleeve assembly 105 is joined to the bushing body 112, an annular cavity 130 is defined in the bushing-casing assembly and one or more ceramic insulating heating sleeves 140a and 140b are inserted into the annular cavity 130 formed therebetween in the manner described above and particulate refractory material 182 is inserted into the first annular space 181 between the heating sleeves 140a, 140b and the bushing casing sidewall 136. The resulting bushing heater assembly is swaged as described above. Thermocouples 155 are inserted into the thermal sleeve thermowells 152 and the sprue bushing is completed also in the manner described above, so that the bushing end caps 170 and 172 are joined to the bushing body 112 and the inlet end 16 thereof. The lower bushing end cap 170 may also be machined prior to or after assembly onto the bushing heater assembly to form a mold bore seat 190 which is separated from the sprue bushing exterior surface by means of annular channels 192, 193 which extends upwardly into the lower end cap portion 170. The mold bore seat 190 assists in minimizing the transfer of heat between the sprue bushing exterior surface 131 and the mold bore walls.

Lastly, the excess end portion 135 of the outlet end 114 of the sprue bushing 100 may be finished by machining to remove a portion of the excess end thereof. In this bushing construction, a portion 131 of the thermal sleeve 132 extends through the bushing endwall 117.

It will be appreciated that the embodiment of the present invention which has been discussed is merely illustrative of one of the applications of this invention and that numerous modifications may be made by those skilled in the art without departing from the true spirit and scope of this invention.

I claim:

1. An internally heated sprue bushing assembly having an inlet for receiving pressurized melt and an outlet for discharge of the pressurized melt, said sprue bushing assembly comprising:
    a bushing casing-core element having an integral outer sidewall and an endwall and an elongated inner core, the outer surface of said elongated inner core and the inner surface of said sidewall defining a generally annular compartment within said bushing casing core element;
    heat conducting means in surrounding relation to said elongated inner core, said heat conducting means axially extending a preselected length within and occupying a portion of said annular compartment;
    heating means in surrounding relation to said heat conducting means and elongated inner core, said heating means axially extending a preselected length within and occupying a portion of said annular compartment;
    a compacted unified mass of particulate material occupying the remainder of said annular compartment; and
    a melt runner passage in said elongated inner core interposed between and in flow communication with said inlet and outlet of said sprue bushing assembly.

2. The sprue bushing assembly of claim 1 wherein said heating means includes a hollow sleeve of a non-electrically conductive material sized to be slidingly received on said heat conducting means.

3. The sprue bushing assembly of claim 1, wherein said heat conducting means includes a hollow sleeve of highly thermally conductive material sized to be slidingly received on said elongated inner core.

4. The sprue bushing assembly of claim 3, wherein said highly thermally conductive hollow sleeve is made of copper and further includes means for receiving temperature monitoring means.

5. The sprue bushing assembly of claim 2 wherein said non-electrically conductive hollow sleeve is made from an extruded refractory material.

6. The sprue bushing assembly of claim 5 wherein said non-electrically conductive hollow sleeve is made of magnesium oxide and said compacted unified mass of particulate material includes magnesium oxide.

7. The sprue bushing assembly of claim 1 wherein said heating means includes two or more hollow sleeves of non-electrically conductive material which axially extend within said annular cavity and encircle said heat conducting means.

8. The sprue bushing assembly of claim 2, wherein said elongated inner core is integral with said bushing outer sidwall and outer endwall.

9. The spruce bushing assembly of claim 7 wherein each of said non-electrically conductive hollow sleeves is circumferentially wound with a separate resistance wire, each of said resistance wires being operatively connectable to a power source, said heat conducting means further including temperature monitoring means operatively associated with each of said first hollow sleeves, whereby heat supplied by one of said separate resistance wires can be independently controlled and monitored with respect to the other of said separate resistance wires.

10. The sprue bushing assembly of claim 3 wherein said high thermally conductive hollow sleeve includes at least one separate thermowell passage adapted to receive a separate removable thermocouple lead therein for monitoring the heat applied by said heating means to said elongated inner core.

11. An internally heated spure bushing assembly having an inlet for receiving pressurized melt and an outlet for the discharge of the pressurized melt, the sprue bushing assembly comprising:
    a unitary bushing casing-core element having an integral elongated outer sidewall, and endwall and an elongated inner core, the elongated inner core having an internal portion containing a melt runner passage between and in flow communication with the inlet and the outlet of the sprue bushing assembly, said elongated inner core having a distinct outer portion containing a highly thermally conductive material for transferring heat from a heating means of said sprue bushing assembly to the elongated inner core internal portion, the outer surface of said elongated inner core distinct outer portion and the inner surface of said outer sidewall defining a generally annular compartment within said bushing casing-core element, the heating means of said sprue bushing assembly being disposed in surrounding relation to said elongated inner core distinct outer portion, said heating means axially extending a preselected length within and occupying a portion of said annular compartment, and a compacted unified mass of particulate material occupying the remainder of said annular compartment.

12. The sprue bushing assembly of claim 11, wherein the axial length of said elongated inner core of said bushing casing-core element is greater than the axial length of said integral outer sidewall of said bushing casing-core element, said inner core further forming a part of said sprue bushing pressurized melt inlet.

13. The sprue bushing assembly of claim 11, wherein said elongate inner core distinct outer portion includes a layer of copper and said heating means includes at least one hollow sleeve of a non-electrically conductive material sized to be slidingly received on said elongated inner core distinct outer portion, the at least one non-electrically conductive hollow sleeve being circumferentially wound with a resistance wire which is operably connectable to a power source.

14. In an internally heated sprue bushing assembly and having a dual element heating element for independently heating one, two, or both of two heating zones of the sprue bushing, the improvement comprising:

a bushing casing-core element including an generally cylindrical outer sidewall and an endwall integrally joined together and a generally cylindrical inner core axially extending therethrough and generally centrally disposed therein, said integral inner core being radially separated from said sidewall by an annular compartment axially extending through said bushing casing-core element, said inner core having a melt runner passage interposed between and in flow communication with a respective inlet and outlet of said sprue bushing assembly, said inner core further having an outer layer of thermally conductive material axially extending along the outer surface of said inner core between the inlet and outlet of said sprue bushing assembly, said inner core outer layer including means for monitoring the temperature of said inner core during operation of said sprue bushing assembly, and a dual heating element adapted to fit within said annular compartment in surrounding relation to said inner core outer layer, said heating element including first and second electrically non-conductive sleeves, each of said first and second sleeves being circumferentially wound with separate resistance wires which form heating coils on each of said first and second sleeves, said first and second sleeves including three aligned passages axially extending within said first and second sleeves, each of said passages being adapted to receive opposite ends of resistance wires and electrical conducting means in electrical engagement therein, a first passage of said first sleeve receiving one end of a first sleeve resistance wire and a first electrical conducting means therein in electrical engagement therewith, a third passage of said second sleeve receiving a second sleeve resistance wire and a third electrical conducting means therein in electrical engagement therewith, a second passage of said first and second sleeves receiving, respectively, the other end of said first sleeve resistance wire and the other end of said first sleeve resistance wire, the second opening of said first and second sleeve means further receiving a length of a second electrical conducting means therein in electrical engagement with said first and second sleeve resistance wires, thereby forming separate electrical circuits for each of said first and second sleeves.

15. The sprue bushing assembly of claim 14, wherein said generally cylindrical inner core is joined to the bushing integral endwall near the sprue bushing outlet.

16. The sprue bushing assembly of claim 14, wherein said generally cylindrical outer sidewall, said endwall and said generally cylindrical inner core are integral.

17. The sprue bushing assembly of claim 14, wherein said inner core outer layer copper or an alloy thereof and is formed from a sleeve adapted to be slidingly received on said inner core, said copper sleeve including an axial slot adapted to receive a thermowell.

18. An internally heated sprue bushing assembly having an inlet for receiving pressurized melt and an outlet for the discharge of said pressurized melt, said sprue bushing assembly comprising:

a unitary bushing casing-core element having an integral outer sidewall, an endwall and an elongated inner core, the outer surface of said elongated inner core and the inner surface of said sidewall defining a generally annular compartment within said bushing casing;

heating means in surrounding relation to said elongated inner core, said heating means axially extending a preselected length within and occupying a portion of said annular compartment;

a compacted unified mass of particulate material occupying the remainder of said annular compartment; and a melt runner passage in said elongated inner core interposed between and in flow communication with said inlet and outlet of said sprue bushing assembly.

* * * * *